(12) United States Patent
Guo et al.

(10) Patent No.: US 8,903,389 B2
(45) Date of Patent: *Dec. 2, 2014

(54) METHOD AND APPARATUS FOR IDENTIFYING USER EQUIPMENT, AND METHOD FOR TRANSMITTING AND ALLOCATING A TEMPORARY IDENTIFIER

(71) Applicant: Huawei Technologies Co., Ltd., Shenzhen, Guangdong (CN)

(72) Inventors: Xiaolong Guo, Beijing (CN); Ming Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/849,299

(22) Filed: Mar. 22, 2013

(65) Prior Publication Data

US 2013/0217388 A1 Aug. 22, 2013

Related U.S. Application Data

(63) Continuation of application No. 13/540,331, filed on Jul. 2, 2012, now Pat. No. 8,428,590, which is a (Continued)

(30) Foreign Application Priority Data

Jul. 27, 2007 (CN) .......................... 2007 1 0137637

(51) Int. Cl.
*H04W 4/00* (2009.01)
*H04W 60/00* (2009.01)
(Continued)

(52) U.S. Cl.
CPC ......... *H04W 60/00* (2013.01); *H04L 29/12207* (2013.01); *H04L 61/20* (2013.01); *H04W 8/26* (2013.01); *H04W 28/08* (2013.01); *H04W 68/00* (2013.01); *H04L 67/34* (2013.01)

USPC ........ 455/435.1; 455/410; 455/411; 455/418; 455/420

(58) Field of Classification Search
USPC ............ 455/410–411, 418–420, 435.1–435.3
See application file for complete search history.

(56) References Cited

U.S. PATENT DOCUMENTS 6,983,159 B2 1/2006 Di Pasquale et al.
7,206,301 B2 4/2007 Wu et al.
(Continued)

FOREIGN PATENT DOCUMENTS

CN 1356818 A 7/2002
CN 1852549 A 10/2006
(Continued)

OTHER PUBLICATIONS

3GPP TS 23.401 V1.0.0, (May 2007), GPRS enhancements for E-UTRAN access.*

(Continued)

*Primary Examiner* — Shahriar Behnamian
(74) *Attorney, Agent, or Firm* — Leydig, Voit & Mayer, Ltd.

(57) ABSTRACT

A method and an apparatus for identifying a UE in an SAE network, and an MME are provided herein. The method includes: receiving an SAE-TMSI which is allocated to a UE that accesses an SAE network and includes at least: a pool-ID, an MME-ID, and a UE temporary identifier; using the SAE-TMSI to temporarily identify the UE in the SAE network. The apparatus includes: a receiving unit and a temporary identifying unit. The MME includes a temporary identifier allocating unit. Moreover, a method for transmitting and allocating a temporary identifier, and a method for receiving and transmitting information according to the temporary identifier are disclosed herein.

11 Claims, 10 Drawing Sheets

Related U.S. Application Data continuation of application No. 12/691,137, filed on Jan. 21, 2010, now Pat. No. 8,238,909, which is a continuation of application No. PCT/CN2008/071780, filed on Jul. 28, 2008.

(51) Int. Cl.
  *H04L 29/12* (2006.01)
  *H04W 8/26* (2009.01)
  *H04W 28/08* (2009.01)
  *H04W 68/00* (2009.01)
  *H04L 29/08* (2006.01)

(56) References Cited

U.S. PATENT DOCUMENTS

| | | |
|---|---|---|
| 2003/0037381 A1 | 2/2003 | Hashimoto et al. |
| 2007/0238461 A1 | 10/2007 | Lundin |
| 2009/0239502 A1 | 9/2009 | Dempo et al. |
| 2010/0323696 A1 | 12/2010 | Cherian et al. |

FOREIGN PATENT DOCUMENTS

| | | |
|---|---|---|
| CN | 101005692 A | 7/2007 |
| EP | 0544462 A2 | 6/1993 |
| EP | 1715715 A1 | 10/2006 |
| WO | WO 0206582 A1 | 1/2002 |
| WO | WO 02076130 A2 | 9/2002 |
| WO | WO 2005060297 A1 | 6/2005 |

OTHER PUBLICATIONS

3GPP TS 23.401 V1.0.0, May 2007.*
Search Report in corresponding Chinese Patent Application No. 2011102552775 (Mar. 27, 2013).
3GPP TS 23.401 V1.0.0—"Specification Group Services and System Aspects; GPRS Enhancements for E-UTRAN Access (Release 8)," May 2007, 3GPP, Valbonne, France.
Extended European Search Report in corresponding European Patent Application No. 12180439.7 (Oct. 31, 2012).
U.S. Appl. No. 13/253,704 (Jul. 12, 2012).
U.S. Appl. No. 12/691,137 (Jul. 12, 2012).
International Search Report in corresponding PCT Patent Application No. PCT/CN2008/071780 (Nov. 6, 2008).
Written Opinion of the International Searching Authority in corresponding PCT Patent Application No. PCT/CN2008/071780 (Nov. 6, 2008).
Extended European Search Report in related European Patent Application No. 11007988.6 (Mar. 20, 2012).
Extended European Search Report in corresponding European Patent Application No. 08783773.8 (Feb. 18, 2011).
Rejection Decision in corresponding Japanese Patent Application No. 2010-517260 (Jan. 13, 2012).
3GPP TS 23.003 V7.4.0—"Technical Specification Group Core Network and Terminals; Numbering, Addressing, and Identification (Release 7)," Jun. 2007, 3GPP, Valbonne, France.
3GPP TS 23.236 V7.0.0—Technical Specification Group Services and System Aspects; Intra-Doman Connection of Radio Access Network (RAN) Nodes to Multiple Core Network (CN) Nodes (Release 7), Dec. 2006, 3GPP, Valbonne, France.
3GPP TSG-RAN WG3#53—"SAE/LTE Identities," Aug. 28, 2006, 3GPP Valbonne, France.
3GPP TSG SA WG2—"Globally Unique Temporary Identities," Nov. 2007, 3GPP, Valbonne, France.
3GPP TSG SA WG2 Meeting #59—"Discussion on the Structure of S-TMSI," Aug. 2007, 3GPP, Valbonne, France.
Extended European Search Report in corresponding European Patent Application No. 1107988.6 (Mar. 20, 2012).
Extended European Search Report in corresponding European Patent Application No. 13164621.8 (May 21, 2013).
1st Office Action in corresponding Japanese Patent Application No. 2012-086168 (Jul. 9, 2013).
<www.3gpp.org - /ftp/tsg_sa/wg2_arch/TSGS2_17/tdocs/>.
<www.3gpp.org - /ftp/tsg_sa/WG2_Arch/TSGS2_55_Busan/Docs/>.
<www.3gpp.org - /ftp/tsg_sa/wg2_arch/TSGS2_56_Florence/Docs/>.
<FTP-Verzeichnis /tsg_ran/WG2_RL2/TSGR2_51/Documents/ auf ftp.3gpp.org>.
<www.3gpp.org - /FTP/tsg_ran/WG3_lu/TSGR3_54/docs/>.
<www.3gpp.org - /ftp/tsg_ran/wg2_r12/TSGR2_56/Documents/>.
<www.3gpp.org - /ftp/twg_ran/WG3_lu/TSGR3_53bis/docs/>.
<www.3gpp.org - /ftp/tsg_ran/wg2_r12/TSGR2_55/Documents/>.
<www.3gpp.org - /ftp/tsg_sa/wg2_arch/TSGS2_57_Beijing/Docs/>.
<www.3gpp.org - /ftp/TSG_SA/WG2_Arch/TSGS2_58_Orlando/Docs/>.
"Input to 'connection of multiple core network nodes'," Agenda Item Release 5 (lu-flex), TSG-SA WG2 SA2-#17 Meeting, Goteborg, Sweden, 3rd Generation Partnership Project, Valbonne, France (Feb. 26-Mar. 2, 2001).
"SAE/LTE Identities," Agenda Item 8.1, 3GPP TSG SA WG2 Architecture—S2#55, Busan, South Korea, 3rd Generation Partnership Project, Valbonne, France (Oct. 23-27, 2006).
"Triggering mobility operation related to MME and UPE pool change," Agenda Item 08.3c, 3GPP TSG SA WG2 Architecture—S2#56, Florence, Italy, 3rd Generation Partnership Project, Valbonne, France (Jan. 15-19, 2007).
"Discussion on configuration of tracking area," Agenda Item 12.3.6, 3GPP TSG-RAN WG2 #51 meeting, Denver, Colorado, 3rd Generation Partnership Project, Valbonne, France (Feb. 13-18, 2006).
"The discussion of Multi-register TA concept," Agenda Item 13.8.10, 3GPP TSG RAN WG3 Meeting #54, Riga, Latvia, 3rd Generation Partnership Project, Valbonne, France (Nov. 6-10, 2006).
"Discussion on contents of message 3," Agenda Item 11.9, 3GPP TSG RAN WG2 #56, Riga, Latvia, 3rd Generation Partnership Project, Valbonne, France (Nov. 6-10, 2006).
"Tracking Area Concept for LTE/SAE (Revision of R3-061542)," Agenda Item 7.7, 3GPP TSG RAN WG3 Meeting #53bis, Seoul, Korea, 3rd Generation Partnership Project, Valbonne, France (Oct. 10-13, 2006).
"Network Attach Procedure," Agenda Item 9, TSG-RAN WG2 Meeting #55, Seoul, Korea, 3rd Generation Partnership Project, Valbonne, France (Oct. 9-13, 2006).
"S-TMSI," Agenda Item 8.2.7, 3GPP TSG SA WG2 Architecture—S2#57, Beijing, China, 3rd Generation Partnership Project, Valbonne, France (Apr. 23-27, 2007).
"PDN GW, Serving GW, MME and SGSN selection," Agenda Item 8.1.1, 3GPP TSG SA WG2 Architecture—S2#58, Orlando, Florida, 3rd Generation Partnership Project, Valbonne, France (Jun. 25-29, 2007).
1st Office Action in related U.S. Appl. No. 14/049,990 (Jan. 6, 2014).

\* cited by examiner

METHOD AND APPARATUS FOR IDENTIFYING USER EQUIPMENT, AND METHOD FOR TRANSMITTING AND ALLOCATING A TEMPORARY IDENTIFIER

CROSS-REFERENCE TO RELATED APPLICATIONS

This application is a continuation of U.S. patent application Ser. No. 13/540,331, filed on Jul. 2, 2012. U.S. patent application Ser. No. 13/540,331 is a continuation of U.S. patent application Ser. No. 12/691,137, filed on Jan. 21, 2010. U.S. patent application Ser. No. 12/691,137 is a continuation of International Patent Application No. PCT/CN2008/071780, filed on Jul. 28, 2008. The International Application claims priority to Chinese Patent No. 200710137637.5, filed on Jul. 27, 2007. The aforementioned patent applications are hereby incorporated by reference in their entireties.

FIELD OF THE INVENTION

The present invention relates to communication technologies, and in particular, to a method and an apparatus for identifying a User Equipment (UE), and a method for transmitting and allocating a temporary identifier.

BACKGROUND

With the development of the network, in the $3^{rd}$ Generation Partnership Project (3GPP), manufacturers are researching the Long Term Evolved (LTE)/System Architecture Evolved (SAE) actively. As shown in FIG. 1, the LTE/SAE architecture includes: (1) a Mobility Management Entity (MME) 11, configured to store mobility management context of a UE, for example, user identifier, mobility management state and location information, to handle Non Access Stratum (NAS) signaling, and to ensure security of the NAS signaling; and (2) an SAE gateway (GW), including a Serving Gateway (S-GW) 121 and a Packet Data Network (PDN) GW 122, where the S-GW and the P-GW are two logical entities which may exist on the same physical entity or different physical entities.

The S-GW stores the user-plane context of the UE, for example, an IP address and route information of the UE, and performs legal monitoring and packet data routing. The interface S11 between the S-GW and the MME is responsible for communication between the MME and the S-GW, and exchanging mobility management information and session control information of a UE.

The MME 11 works together with an Evolved-Universal Terrestrial Radio Access Network (E-UTRAN) to implement the control-plane connection through the S1-MME interface. The S-GW works together with the E-UTRAN to implement the user-plane connection through the S1-U interface. The MME 11 is connected with the 2G/3G Serving GPRS Supporting Node (SGSN) through an S3 interface, and serves as a mobility control-plane anchor between the 3G network and the SAE network of the UE. The S-GW is connected with the 2G/3G SGSN through an S4 interface, and serves as a mobility user-plane anchor between the 3G network and the SAE network of the UE.

The P-GW 122 serves as a user-plane anchor for a UE to access PDN, communicates with an external PDN through an SGi reference point, and implements packet routing and forwarding, policy and charging enhancement, and packet filtering based on each user. The P-GW 122 is connected with the S-GW 121 through an S5 or S8 interface (in the case of roaming) to transmit the bearer control information such as bearer creation, bearer modification and bearer deletion, and to route the packet data.

A Policy and Charging Rules Function (PCRF) 13 transmits Quality of Service (QoS) and charging policy control information to the P-GW through an S7 interface.

A concept of Temporary Mobile Subscriber Identifier (TMSI) is involved both in SAE network and Universal Mobile Telecommunications System (UMTS). In a Circuit Switched (CS) domain, the identifier is known as TMSI; in a Packet Switched (PS) domain, the identifier is known as Packet TMSI (P-TMSI). The TMSI is designed to prevent a user from being tracked when the user's International Mobile Subscriber Identifier (IMSI) is exposed at an air interface, which may result in infringement on the user privacy. Therefore, after the user is attached to the network, the SGSN or the Mobile Switching Center (MSC) allocates a TMSI or a P-TMSI to a UE. For example, the SGSN allocates a P-TMSI to the UE, and the MSC allocates a TMSI to the UE. The TMSI is unique in a Location Area (LA) of the UE, or the P-TMSI is unique in a Routing Area (RA), where one LA may have several RAs. When the user accesses the network, a TMSI or a P-TMSI may be used as the identifier of the UE. When the user performs downlink paging, the user may be paged by a TMSI or a P-TMSI. If the UE discovers the paging information with the UE's TMSI or P-TMSI on the paging channel, the UE initiates the access.

When the UE accesses a new core network node, if no Iu-flex concept is introduced, the new node searches for the old node to obtain the context of the UE according to an LA Identifier (LAI) or an RA identifier (RAI). Due to existence of the Iu-flex, the LAI and the RAI are not enough for searching the old node. Thus, function of the TMSI or P-TMSI is further adopted together with LAI/RAI to determine the old node. The Iu-flex means that a many-to-many relation exists between access network device(s) and core network device(s) on the Iu interface. For example, an RNC is connected with many SGSNs, and an SGSN may access many RNCs. Multiple SGSNs constitute a resource pool. In a resource pool, multiple core network nodes (such as SGSN) are connected with all Radio Access Network (RAN) nodes (such as RNC) in the resource pool. In the traditional mode, however, one access network node is connected with only one core network node.

Furthermore, in the case of Iu-flex, the RAN may find the node, which the UE registers with, according to the information in the TMSI/P-TMSI, as detailed below.

The TMSI/P-TMSI includes 0 to 10 configurable bits which may serve as a Network Resource Identifier (NRI). The NRI is used to distinguish different core network nodes in a resource pool. When the UE accesses the pool for the first time, the RAN node is unable to find the corresponding NAS node through the NAS Node Selection Function (NNSF), so the RAN node selects a proper core network node according to principle(s) such as load sharing. After registering with a CN node in the resource pool, when moving in the resource pool, the UE does not change the CN node. The principle is as follows: The core network node, which the UE registers to, allocates a TMSI or a P-TMSI to the UE, and the TMSI or P-TMSI carries an NRI that represents the core network node. In this way, when the UE attempts to access, the UE sends an Initial Direct Transfer (DT) message to the RAN, where the message carries the TMSI or P-TMSI. The RAN node selects the previously registered core network node corresponding to the NRI in the received TMSI or P-TMSI. Therefore, the UE moves within the resource pool, while the core network node keeps unchanged. Nevertheless, when the UE moves out of the resource pool, the RAN node is unable to find the CN node with corresponding NRI, the RAN node reselects a new core network node, and the UE moves within the new resource pool, still with the core network node keeping unchanged.

The prior TMSI or P-TMSI is consisted of 32 bits, including: several (generally two) bits for distinguishing PS domain and CS domain, configurable 0-10 bits for NRI (0 bit indicates no flex), several bits for a restart identifier, and several other bits. The bits may be allocated adaptively according to the network deployment.

For example, in a TMSI or P-TMSI, two bits are used to distinguish the TMSI and the P-TMSI, five bits are used as a restart identifier which prevents allocating of an allocated TMSI caused by restart of the node, seven bits are used as an NRI, and the remaining 18 bits are available for allocating a UE identifier to each core network node.

In the conventional art, a TMSI or P-TMSI is designed in a resource pools. As shown in FIG. 2, the resource pools include Pool 21, Pool 22, Pool 23, Pool 24, Pool 25, and Pool 26. The NRIs of Pool 21 are 16-20; the NRIs of Pool 22 are 11-15; the NRI of Pool 23 is 1; the NRIs of Pool 24 are 6-10; the NRIs of Pool 25 are 1-5; and the NRI of Pool 26 is 11. As shown in FIG. 2, it is assumed that Pool 21, Pool 22, Pool 24, and Pool 25 are partially overlapped; each resource pool includes five core network nodes, where the core network nodes are distinguished with different NRIs; NRI may be reused in non-adjacent pools because the NAS node selection function or the uniqueness of the TMSI of UE in the paging area is not affected. It is assumed that a maximum of one million users can be attached to each core network node, there are 12 million users in the overlapped area of the pool, and fewer users exist in other areas.

In this network, 20 core network nodes are enough for attaching 12 million users. The NRI may have five bits (because $2^5=32$, so the NRI is available for identifying 32 core network nodes). The identifiers allocated independently by each node is consisted of 21 bits (because $1,000,000=2^{20}$, so the NRI is available for identifying two million users), two bits are used for distinguishing PS domain and CS domain, and the remaining 4 (32−5−21−2) bits are used for restarting.

The SAE network still involves design of Flex. Like the prior method, in a resource pool, more than one CN node (such as MME) is connected with all RAN nodes (such as eNodeB, i.e. ENB) in the resource pool. When a UE enters a resource pool initially, a RAN node selects a CN node according to load sharing principle. In this way, the UE is always anchored at the selected CN node when moving in the pool or accessing. Both MME and S-GW can be connected with ENB in the SAE network, thus there are two concepts: MME pool and S-GW pool. Pool overlapping is also allowed in the SAE network. In the SAE network, the MME pool or the S-GW pool includes a complete Track Area (TA). TA is similar to LA or RA in UMTS network.

FIG. 3 shows allocation of TMSI in an overlapped MME pool. In FIG. 3, it is assumed that the UE allocates one TA at a time. When the UE accesses MME pool 1 for the first time (for example, the UE enters ENB 1), an MME is selected from the MME Pool 1 (briefly known as MP 1). While the UE moves from ENB 1 to ENB 2 or ENB 3, it is not necessary to change the MME. When the UE moves to ENB 4, because of no interface between ENB 4 and the MME in the source MP 1 (ENB 4 belongs to MP 2 only), it is necessary to reselect the MME in the MP 2. In FIG. 3, ENB 2 and ENB 3 belong to two MME pools. That is, ENB 2 is connected with each MME of the two pools through an interface, and ENB 3 is connected with each MME of the two pools through an interface. Therefore, ENB 2 and ENB 3 are the overlap part between MME pool 1 and MME pool 2. The benefits of the overlapping are: When the UE returns from ENB 4 to ENB 3, because ENB 3 is connected with MME pool 2, it is not necessary to reselect the MME. Reselection of the MME is not required until the UE accesses ENB 1. That is, the overlapping avoids the ping-pong effect (i.e. ping-pong relocation of the MME). Provided that there is no interface between ENB 3 and MME pool 2, when the UE moves between ENB 3 and ENB 4 back and forth, a ping-pong effect is initiated.

For the TA concept, the SAE network allows allocating more than one TA to the UE, which is different from a UTMS network, in a UTMS network, only one LA or RA can be allocated to a UE. In this way, if the UE in the figure above registers with the pool and the allocated TA list includes TA 1 and TA 2, no update needs to be initiated when the UE moves between ENB 1 and ENB 2 back and forth. That is, no update needs to be initiated when the UE moves within the allocated TAs.

SUMMARY

Aspects of the present invention provide a method and an apparatus for identifying a UE in evolved network. A resource pool identifier (pool-ID) is set in a System Architecture Evolved-Temporary Mobile Subscriber Identity (SAE-TMSI) to speed up pre-processing of update for an access device and simplify network resource configuration performed by the operator.

Aspects of the present invention also provide an MME in evolved network, a method for transmitting and allocating an SAE-TMSI, and a method for receiving and sending information according to the SAE-TMSI, with a view to reducing waste of radio air interface resource.

According to an aspect of the present invention, a method for identifying a UE in an evolved network is provided, which may include: (1) allocating, by an SAE network, an SAE-TMSI to a UE when the UE accesses the SAE network, where the SAE-TMSI includes at least: a pool-ID, an MME-identifier (MME-ID), and a UE temporary identifier; and (2) using the SAE-TMSI to temporarily identify the UE that accesses the SAE network.

According to an aspect of the present invention, an apparatus for identifying a UE in evolved network is provided, which may include: (1) a receiving unit, configured to: receive an access request that carries an SAE-TMSI allocated to the UE which accesses an SAE network, where the SAE-TMSI includes at least: a pool-ID, an MME-ID, and a UE temporary identifier; and (2) a temporary identifying unit, configured to use the SAE-TMSI to temporarily identify the UE that accesses the SAE network.

According to an aspect of the present invention, an MME in evolved network is provided, which may include: a temporary identifier allocating unit, configured to allocate an SAE-TMSI to a UE that accesses an SAE network, where the SAE-TMSI includes at least: a pool-ID, an MME-ID, and a UE temporary identifier.

A method for transmitting an SAE-TMSI in an embodiment of the present invention is applicable to transmitting an SAE-TMSI from a UE to a core network, and includes: (1) sending, by a UE, a Radio Resource Control (RRC) request that carries an Initial Direct Transfer message to an evolved RAN entity in an SAE network when the UE accesses the SAE network, where the request carries an SAE-TMSI and a NAS message, and the NAS message carries no SAE-TMSI; and (2) adding, by the evolved RAN entity, the SAE-TMSI into an initial UE message through an S1 interface when the evolved RAN entity sets up a signaling connection with an MME through the S1 interface, and submitting the SAE-TMSI to a core network node through the initial UE message.

According to an aspect of the present invention, a method for allocating an SAE-TMSI is provided, which may include: (1) calculating an SAE-TMSI for allocation, which fulfills that a paging group calculated according to the SAE-TMSI is consistent with a paging group calculated according to an IMSI; (2) sending a paging message that carries the SAE-TMSI to an evolved RAN entity when paging a UE, where the paging message carries no IMSI; and (3) calculating, by the evolved RAN entity, a paging group of the UE according to the SAE-TMSI, and paging the UE.

According to an aspect of the present invention, a method for receiving and transmitting information according to an SAE-TMSI is provided, which may include: (1) sending, by a new MME, an identifier request or context request that carries an SAE-TMSI to an old MME in an attaching process, if the SAE-TMSI is unique in the MME, where the request carries no old Track Area Identifier (TAI); or sending, by a new MME, a request for obtaining UE context to an old MME in a location update process of the MME, where the request carries the SAE-TMSI but carries no old location identifier; and (2) resolving, by the MME, the SAE-TMSI in the request to obtain an address of the old MME, if the MME that receives the request is not the old MME of the UE.

DETAILED DESCRIPTION

The embodiments of the present invention are described in detail below with reference to accompanying drawings.

Figure 4:
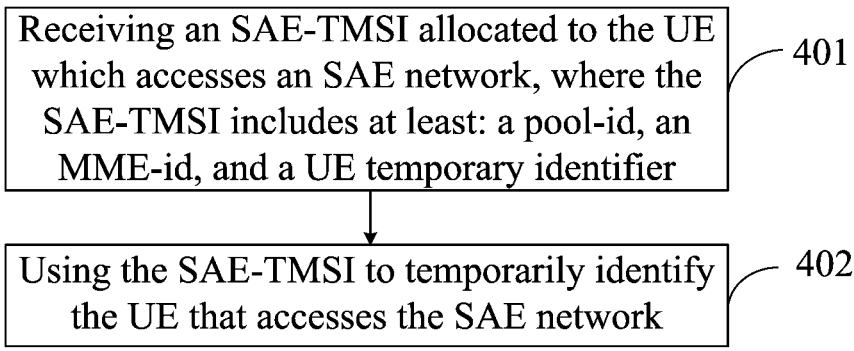
FIG. 4 is a flowchart of a method for identifying a UE in an SAE network according to an embodiment of the present invention.

FIG. 4 is a flowchart of a method for identifying a UE in an SAE network according to an embodiment of the present invention. As shown in FIG. 4, the method includes:

Step 401: An SAE-TMSI is received, where the SAE-TMSI is allocated to a UE accessing SAE network, and the SAE-TMSI includes at least: a pool-ID, an MME-ID, and a UE temporary identifier.

In access process, a new SAE-TMSI is allocated to the UE. Generally, allocating a new SAE-TMSI to the UE usually happens in the following scenarios: The UE accesses the network for the first time, or the UE enters a new pool from another pool, or the UE initiates a location update process and the network decides to allocate a new SAE-TMSI.

Step 402: The SAE-TMSI is used to temporarily identify the UE that accesses the SAE network.

That is, a pool-ID, an MME-ID, and UE temporary identifier are added into the SAE-TMSI in an embodiment of the present invention. The pool-ID is an identifier configured for the pool, and may be unique or non-unique in a Public Land Mobile Network (PLMN). However, no duplicate pool-ID of the adjacent pool with an overlapping part is allowed. The preferred implementation mode is: The pool-ID set in the adjacent pool without an overlapping part is also unique; the MME-ID is the identifier of the MME in the pool, and is unique in the pool; the UE temporary ID is a unique identifier available from each MME for being allocated to the UE.

Preferably, in this embodiment, a restart identifier (restart-ID) may be added into the SAE-TMSI. That is, an SAE-TMSI includes: a pool-ID, an MME-ID, a UE temporary id, and a restart-ID. The preferred setting mode is that such IDs are added sequentially into the SAE-TMSI in the way described above. The restart-ID prevents re-allocation of an identifier at restart of the MME. The restart-ID may increase or decrease according to the number of times of restart, and may carry a time value.

Preferably, in this embodiment, an identifier for distinguishing communication system types may be added into the SAE-TMSI. For example, the identifier differentiates between different systems such as UMTS and SAE. That is, an SAE-TMSI includes: pool-ID, MME-ID, a UE temporary ID, and an identifier for distinguishing UMTS and SAE, and optionally, an identifier for differentiating between another system and the SAE system. The preferred setting mode is that the identifiers mentioned above are added sequentially into the SAE-TMSI in the way described above. The bit(s) for PS/CS may be multiplexed for the identifier which identifies the UMTS system or SAE system or other system, when the number of bits of the SAE-TMSI is the same as that of the TMSI/P-TMSI (namely, 32 bits). For example, 00/01 represents CS, 10 represents SAE, and 11 represents PS.

Preferably, in this embodiment, a restart-ID and an identifier for identifying the UMTS/SAE (or other system) may be added into the SAE-TMSI together. That is, an SAE-TMSI includes: a pool-ID, an MME-ID, a UE temporary id, a restart-ID, and an identifier for identifying the UMTS/SAE (or other system). The preferred setting mode is that the identifiers mentioned above are added sequentially into the SAE-TMSI in the way described above.

Preferably, the pool-ID may carry a PLMN-ID. That is, the pool-ID is composed of a Mobile Country Code (MCC), a Mobile Network Code (MNC), and an internal pool identifier of the PLMN. The length of an identifier involved in this embodiment is configurable according to the actual network conditions. However, the design of the SAE-TMSI is not limited to the mode disclosed above, and other appropriate design modes are also applicable.

In this embodiment, a pool-ID, an MME-ID, and UE temporary id are added into an SAE-TMSI and optionally, an SAE-TMSI also includes a restart-ID and/or an identifier for identifying a UMTS/SAE (or other system). The merits of using an SAE-TMSI are described below, supposing that an SAE-TMSI includes a pool-ID, an MME-ID, and a UE temporary id.

Figure 1:
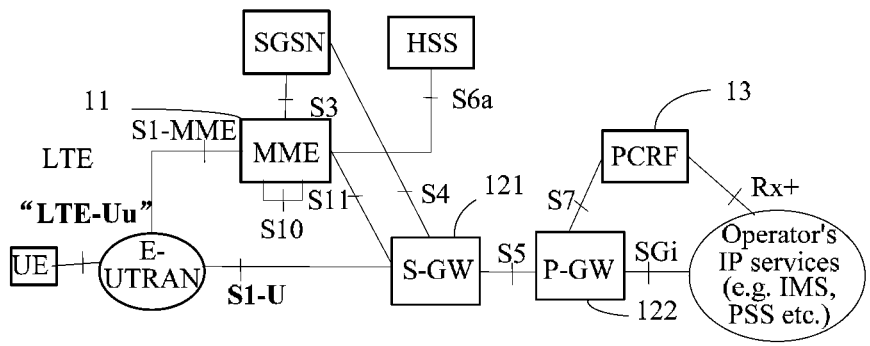
FIG. 1 shows a structure of an LTE/SAE network in the conventional art.
Figure 2:
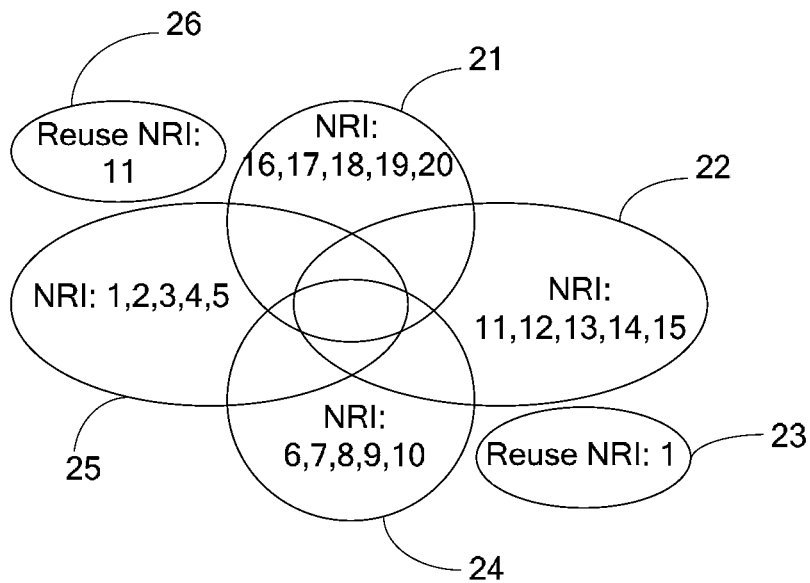
FIG. 2 shows how to design a TMSI/P-TMSI in a pool in the conventional art.

The SAE-TMSI includes a pool-ID. An MME-ID can be configured within the pool independently, regardless of the MME configuration in the adjacent pool. This is different from that in the conventional art. In the conventional art (as shown in FIG. 2), in the four adjacent pools, it is not allowed to allocate the same NRI. The NRI is equivalent to the MME-ID in this embodiment. Because they are in different networks (the NRI is in the UMTS, and the MME-ID is in the SAE), they have different names. If the same NRI is allocated, it is possible that the same TMSI/P-TMSI is allocated to multiple UEs in the overlapping area, which leads to confusion and failure of paging the proper UE. That is, in the conventional art, at the time of adding, modifying, or deleting an NRI configured by the core network node, it is necessary to consider the conditions of other adjacent pools and avoid duplicate NRIs. After the NRI of a core network node is set, it is necessary to notify other pools so as to prevent duplicate NRIs. In other words, in the conventional art, at the time of adding, modifying or deleting an NRI of a core network node for an accessing UE in a pool, it is necessary to consider conditions of other adjacent pools and avoid duplicate NRIs. At the time of allocating an NRI to an accessing UE, it is necessary to notify other pools and prevent duplicate NRIs in the adjacent pools. Moreover, when a mobile user accesses a network in the conventional art, it is necessary to traverse all network resource identifiers, thus leading to complicated processing, a low processing speed, and low user satisfaction.

In this embodiment, a pool-ID is configured in the pool, and the pool-ID set for the adjacent pool is different. Therefore, at the time of adding, modifying or deleting an MME node and setting an MME-ID within a pool, the MME-ID may be set in the pool independently, without the need of considering conditions of other pools as long as no duplicate MME-ID exists in this pool. That is, in this embodiment, because a pool-ID is configured in the pool, it is not necessary to consider the configuration of the adjacent pool at the time of configuring the MME in this pool.

In this embodiment, when the UE accesses the ENB, the access request carries an SAE-TMSI which includes at least: a pool-ID, an MME-ID, and a UE temporary ID. After receiving the SAE-TMSI, the ENB determines, according to the pool-ID in the SAE-TMSI, which pool the UE accesses. If the configuration of this pool-ID exists in the current pool, the ENB selects the corresponding MME according to the MME-ID, and selects this MME for the UE, thus accomplishing the UE access. If the pool-ID is not configured in the ENB, the ENB may select a new MME directly, without traversing all NRIs.

For this embodiment, setting a unique pool-ID in the PLMN brings the following benefits.

If no duplicate pool-ID exists in the PLMN, the SAE-TMSI is unique in the PLMN, and the old MME may be searched out according to the SAE-TMSI. That is because, when the UE accesses a new core network entity, the new core network entity may search out the old core network entity according to the pool-ID and the MME-ID in the SAE-TMSI of the UE. In the conventional art, however, a TAI needs to be considered in searching for the old core network entity accessed by the UE. Therefore, compared with the conventional art, this embodiment is easier to implement, and saves network resources.

If the pool-ID is unique throughout the PLMN, when the UE accesses the network, it is not necessary to provide the old TAI. For example, the old TAI information does not need to be carried in the NAS messages such as Attach request and Track Area Update (TAU) request.

Nevertheless, when the UE accesses the old network, the RAN adds the old LAI/RAI information of the UE into an initial UE message, with a view to identifying the same TMSI/P-TMSI allocated in different location areas and letting the core network node uniquely determine the UE according to the TMSI and the LAI. In this embodiment, therefore, it is not necessary to add the current TAI of the UE into the initial UE message.

In other words, if the pool-ID in the SAE-TMSI is unique in the PLMN, when the UE accesses the new MME, the new MME obtains information about the address of the old MME from the pool-ID and MME-ID in the SAE-TMSI of the UE; or, if the pool-ID in the SAE-TMSI is not unique in the PLMN, the information about the address of the old MME may be obtained according to the old LAI of the UE alone, or according to both the old LAI and the SAE-TMSI.

Because the SAE-TMSI in an MME is unique, when the UE attaches to the network, the identification request sent by the new MME to the old MME for obtaining the UE IMSI does not need to carry the old TAI information. In the case of flex, the new MME obtains the address of the old MME through the old TAI and the SAE-TMSI (if the SAE-TMSI is unique throughout the PLMN, the new MME can obtain the address of the old MME through the SAE-TMSI alone). If the address obtained by the new MME is not the address of the real old MME, the new MME can forward the identification request to the real old MME through the SAE-TMSI. In the existing UMTS, the old RAI information needs to be carried in the message because the UE needs to be determined according to the old RAI together with the P-TMSI. In an SGSN, a duplicate P-TMSI may exist, but the P-TMSI is surely unique in an RAI. That is, when the UE attaches to the network, the new MME sends a request to the old MME to request an IMSI. Because the new MME has obtained the address of the old MME according to the old TAI and/or SAE-TMSI, the identification request sent to the old MME carries only the SAE-TMSI parameter, and does not need to carry the old TAI any more. If the old MME is the MME previously registered by the UE, the old MME retrieves the IMSI of the UE according to the SAE-TMSI information, and sends an identification response that carries the IMSI to the new MME. If the MME that receives the identification request is not the real old MME of the UE, the MME forwards the message to the real old MME according to the SAE-TMSI, and the old MME retrieves the IMSI according to the SAE-TMSI and returns the IMSI to the new MME. In the existing UMTS system, however, the IMSI needs to be determined according to the SAE-TMSI together with the TAI.

In this embodiment, the SAE-TMSI may be unique at least in the pool. Due to the TA concept, the UE may be registered in multiple TAs or multiple types of TAs. If the list of TAs allocated to the UE is different, the SAE-TMSI needs to be unique in the same TA in the TA list allocated to the UE. Therefore, the preferred embodiment of the present invention is that the SAE-TMSI is unique in the pool, and is unique in overlapping pools. Duplicate SAE-TMSI may exist in the overlapping part. However, other appropriate modes are also applicable, and are not detailed here any further.

Figure 5:
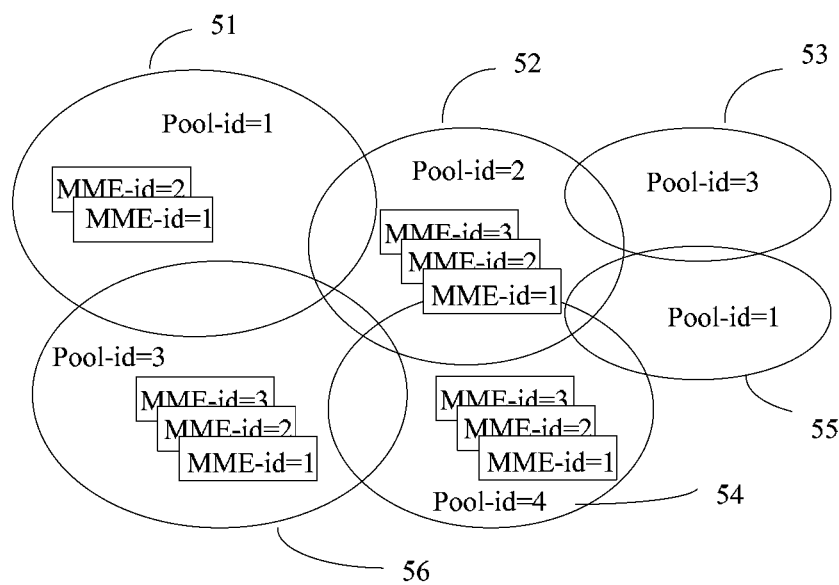
FIG. 5 shows a flowchart of setting a pool-ID which is not unique in a PLMN according to an embodiment of the present invention.

FIG. 5 shows a flowchart of setting a pool-ID which is not unique in a PLMN according to an embodiment of the present invention. As shown in FIG. 5, six pools exist in an area, and one pool-ID is set for each pool, where the pool-ID is not necessarily unique, namely, non-adjacent pools may have the same pool-ID. That is, the pool-ID of the pools numbered 51-55 is set to 1; the pool-ID of the pools numbered 53-56 is set to 2; the pool-ID of the pool numbered 52 is set to 3; the pool-ID of the pool numbered 54 is set to 4. In this way, the PLMN-ID may be reused in the PLMN, and the bits are saved. However, in order to prevent duplicate SAE-TMSI in the overlapping part, no duplicate pool-ID can be used for overlapping pools. That is, it is acceptable that non-adjacent pools have the same SAE-TMSI. That is because the TA list allocated to a UE never crosses different pools, and it is impossible that duplicate SAE-TMSIs exist in the same area. In principle, duplicate pool-ID may be allocated to adjacent pools without any overlapping part, but such a configuration is not recommendable. When an idle UE moves from a pool to an adjacent pool, a TAU process is initiated. If the two pools have the same pool-ID, it is possible that the ENB accessed by the UE selects the MME having the corresponding MME-ID in the adjacent pool directly, without triggering new MME selection. Or, when both pools have the MME-ID in the SAE-TMSI of the UE, no new MME selection is triggered. Therefore, it is preferred if the pool-ID of the pool numbered 55 is set to 5, and the pool-ID of the pool numbered 56 is set to 6, namely, if no duplicate pool-ID exists in the PLMN. In this way, new MME selection is always initiated whenever the UE accesses other pools.

Figure 3:
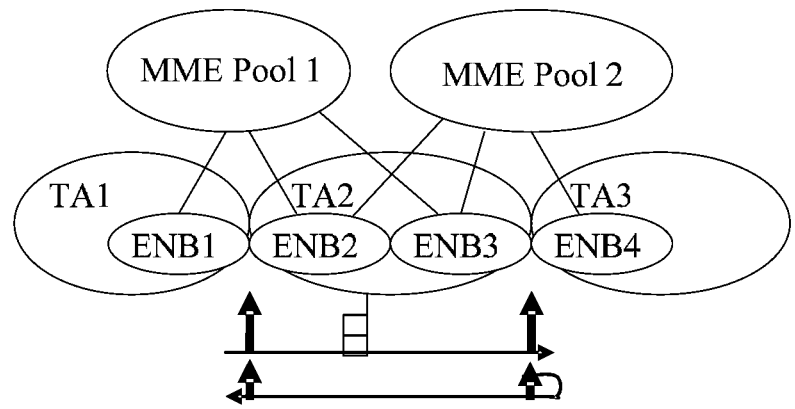
FIG. 3 shows allocation of a TMSI in an overlapped MME pool in the conventional art.

As shown in FIG. 3 and FIG. 5, supposing that the pool-ID of MME pool 1 is 1 and the pool-ID of MME pool 2 is 2, according to the technical solution under the embodiment of present invention, the UE accesses ENB 1 when the UE enters pool 1 for the first time. ENB 1 discovers that the pool-ID in the SAE-TMSI of the UE is not configured or is not equal to 1, and therefore, selects a new MME directly. ENB 1 may select an MME according to the principle(s) such as load balance. When the UE moves to ENB 2 and initiates access, ENB 2 selects the old MME directly according to the pool-ID and the MME-ID in the SAE-TMSI. When the UE moves to ENB 4, a TAU process is triggered. ENB 4 discovers that no such pool-ID is configured (only pool-ID=2 is configured for ENB 4), and then selects a new MME directly. At the time of changing the MME, the new MME needs to obtain information about the context or identifier of the UE. If the pool-ID of the SAE-TMSI is unique throughout the PLMN, the new MME may obtain the address of the old MME directly according to the pool-ID and the MME-ID in the SAE-TMSI (and optionally, MCC and MNC information, namely, PLMN information). If the pool-ID is not unique throughout the PLMN, the new MME needs to obtain the address of the old MME according to the old TAI of the UE. In the case of flex, the information in the SAE-TMSI needs to be considered together to determine the address of the old MME.

Figure 6:
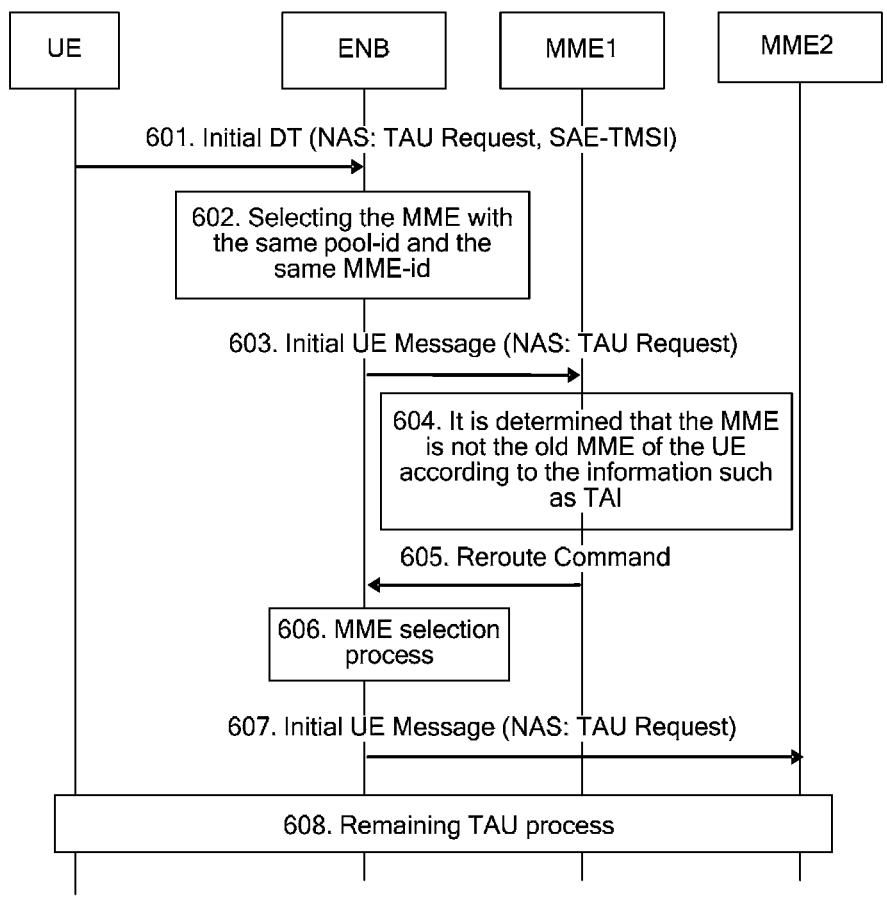
FIG. 6 is a flowchart of reselecting an MME according to an embodiment of the present invention.

Besides, this scenario may occur in the network. The same pool-ID is configured for adjacent pools without any overlapping area. A UE initiates TAU process when moving from a pool to an adjacent pool which has the same pool-ID. An initial direct transfer message is sent to the RAN (which generally refers to the ENB), and the RAN node selects an MME according to the pool-ID and the MME-ID in the SAE-TMSI of the UE (supposing that the MME-ID also exists in the new pool), without triggering new MME selection, because a TAU request is sent to the MME with the same pool-ID and the same MME-ID (in fact, the MME is the MME of the new pool rather than the old MME). Another scenario may occur: If the same pool-ID is configured for adjacent or non-adjacent pools, the old SAE-TMSI is stored at the time of detaching. The UE moves to a new pool after detaching, and attaches to the pool. No new MME selection is triggered, if the pool-ID of the new pool is same as the pool-ID of the pool which UE detaches from, and if the MME-ID in the SAE-TMSI of the UE exists in the new pool. In this case, the accessed MME may be not the most appropriate MME, and it is better to trigger new MME selection. Therefore, a process of reselecting an MME is put forward to cope with the foregoing scenario. FIG. 6 shows the detailed process. FIG. 6 is a flowchart of reselecting an MME according to an embodiment of the present invention. As shown in FIG. 6, it is possible that the pool-ID and the MME-ID of an MME are the same as the pool-ID and the MME-ID in the SAE-TMSI while the MME is actually different. In this case, the process of reselecting the MME is as follows, taking the TAU as an example:

Step 601: The UE sends an Initial Direct Transfer message to the ENB. The Initial Direct Transfer message includes a NAS message, and the NAS message includes a TAU request and an SAE-TMSI. Further, the TAU request may include a TAI.

Step 602: After receiving the Initial Direct Transfer message, the ENB selects an MME (such as MME 1) whose pool-ID and MME-ID are the same as those carried in the SAE-TMSI.

Step 603: The ENB sends an initial UE message to MME 1. The initial UE message carries a TAU request.

Step 604: After receiving the TAU request, MME 1 discovers that the MME 1 itself is not the old MME previously accessed by the UE according to the TAI information (in the case of flex, the SAE-TMSI in the NAS may be considered together to determine the old MME). Therefore, the MME 1 may decide selection of a new MME, and trigger steps 605-607.

Step 605: The MME 1 feeds back a Reroute Command to the ENB.

Step 606: After receiving the Reroute Command, the ENB reselects a new MME, for example, MME 2.

Step 607: The ENB sends an Initial Direct Transfer message to MME 2.

Step 608: The remaining TAU process is performed. The remaining process is well known to those skilled in the art, and is not repeated here any further.

In the attaching process or other processes initiated in this embodiment, the following scenario may occur. The selected MME (such as MME 1) is not the old MME of the UE (the old MME may be determined according to the old TAI information of the UE). The selected MME 1 may trigger selection of a new MME (such as MME 2). Or the ENB selects a new MME (such as MME 2) directly, and forwards a Network Access Server (NAS) message to the new MME 2. The selected MME 1 sends a Reroute Command message to the RAN, and the RAN selects a new MME 2 and sends the message to the new MME 2. Or, the selected MME 1 selects a new MME 2 and forwards the NAS message to the new MME 2 directly. Or, the selected MME 1 selects a new MME 2 and notifies the new MME 2 information to the RAN, and the RAN initiates access to the new MME 2. The prerequisites of triggering the new MME 2 to send a Reroute Command message or triggering the new MME 2 selection may be: The load of the selected MME 1 exceeds a set threshold, and is not appropriate for bearing a new UE; or the selected MME 1 discovers that the request is not a real-time-sensitive NAS request such as TAU or Attach. If such prerequisites are not fulfilled, the new MME 2 selection is necessarily triggered.

This embodiment may avoid reselection in this way: for example, when the UE accesses the RAN, the UE not only reports the SAE-TMSI, but also reports the old TAI to the RAN node. When the RAN node discovers that the TAI does not belong to this pool, the RAN node may select a new core network node. That is, the Intra Domain NAS Node Selector in the Initial Direct Transfer message sent by UE when accessing the RAN further carries a TAI.

Besides, in this embodiment, the IDs in the SAE-TMSI may be configured according to the actual network conditions. For example, it is assumed that one pool is set for each province, the capacity of each MME is 1 million users, a pool in a province has at most six adjacent pools, and a maximum of 100 million users exist in a province. The SAE-TMSI may be set as: 21 bits are used for the UE temporary id (so each MME is available to at most 2 million users), 3 bits are used for the pool-ID (reusable, available to at most 8 adjacent pools), each pool needs 100 MMEs (100 million users/1 million MMEs), and 7 bits are used for the MME-ID (available to at most 128 MMEs). Supposing that the SAE-TMSI has 36 bits constantly (the SAE-TMSI is extensible, and it is assumed that the composition of the SAE-TMSI is SAE-TMSI=pool-ID+MME-ID+UE temporary id+restart-ID), the remaining 5 bits may be used by the restart-ID.

For example, at most 20 million users exist in Beijing's network. The maximum capacity of each MME is 2.5 million users, and each province needs a unique pool-ID. Therefore, 6 bits are used for the pool-ID (available to 64 pools, which are enough if each province has a unique pool-ID), 22 bits are used for the UE temporary id (available to 4 million users), 8 MMEs exist in a pool, and 3 or 4 bits are used for the MME-ID (allowing for extension). The remaining 36−6−22−4=4 bits are available to the restart-ID.

The foregoing example supposes that the SAE-TMSI is constant and the IDs can be configured flexibly according to the network conditions.

Besides, in this embodiment, the SAE network reallocates an SAE-TMSI to a UE when the preset condition(s) of reallocation is (are) fulfilled.

Figure 7:
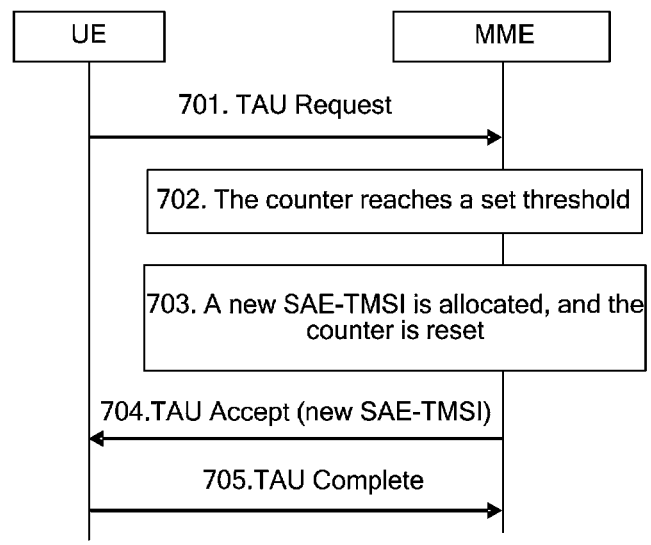
FIG. 7 is a flowchart of the first application instance of reallocating an SAE-TMSI according to an embodiment of the present invention.

FIG. 7 is a flowchart of the first application instance of reallocating an SAE-TMSI according to an embodiment of the present invention.

The SAE-TMSI is unique in a wide scope, and may keep unchanged in a long period. However, for protecting privacy, the SAE-TMSI needs to change periodically, and the network may perform SAE-TMSI reallocation. The preset conditions of the reallocation may be: The reallocation is triggered after the location is updated periodically for n times, or after the MME is changed, or after the MME is changed for n times. For example, a counter is designed for the MME. Once the UE accesses the network or is updated, the counter increases by 1. After the counter reaches the threshold n, the SAE-TMSI is reallocated and sent to the UE, while the counter is reset, as detailed below:

Step 701: When the UE accesses the MME, the UE sends a TAU request to the MME.

Step 702: The MME receives the TAU request, and records the number of times of updating through a counter. When the counter reaches a threshold, the process proceeds to step 703.

Step 703: The MME allocates a new SAE-TMSI to the UE, and resets the counter.

Step 704: Meanwhile, the MME returns a TAU Accept message to the user. The TAU Accept message carries a new SAE-TMSI.

That is, when the counter of the MME reaches the threshold (for example, the counter increases whenever the UE accesses, the MMEs is changed or the TAU requests is sent), the MME allocates a new SAE-TMSI, and sends it to the UE, and then the counter is reset.

Figure 8:
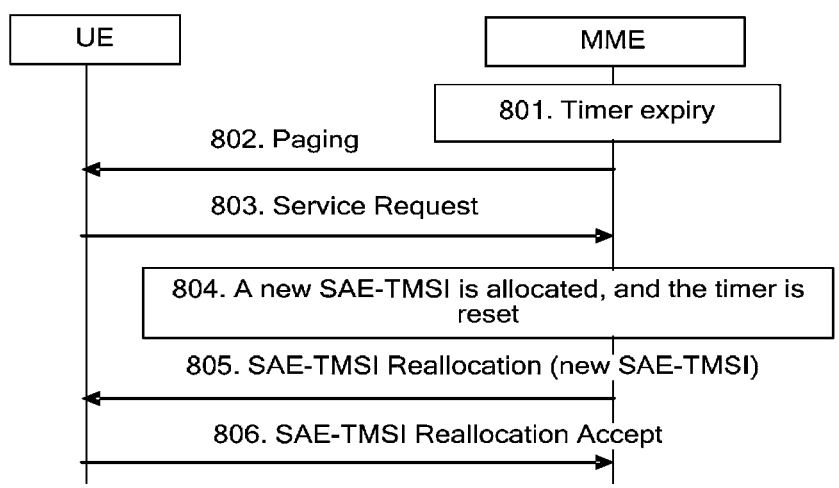
FIG. 8 is a flowchart of the second application instance of reallocating an SAE-TMSI according to an embodiment of the present invention.

FIG. 8 is a flowchart of the second application instance of reallocating an SAE-TMSI according to an embodiment of the present invention. Moreover, a timer may be set in the network. The SAE-TMSI is reallocated upon timeout of the timer. If the UE is idle at timeout of the timer, the SAE-TMSI may be allocated at the time of the UE accessing the network, or of the network paging the UE, as detailed below:

Step 801: A timer is started after the MME allocates an SAE-TMSI to the UE. When the timer reaches the preset time limit, the process proceeds to step 802.

Step 802: The MME sends paging information to the UE, namely, pages the UE.

Step 803: The UE sends a service request to the MME, requesting a new SAE-TMSI.

Step 804: The MME allocates a new SAE-TMSI to the UE, and resets the timer.

Step 805: The MME sends an SAE-TMSI Reallocation message to the UE. The message carries a new SAE-TMSI.

Step 806: The UE returns an SAE-TMSI Reallocation Accept message to the MME.

In FIG. 8, the timer is started after the MME allocates an SAE-TMSI to the UE. The MME needs to allocate a new SAE-TMSI to the UE after timeout of the timer, and send the new SAE-TMSI to the UE. In the example above, if the UE is idle upon timeout of the timer, the MME pages the UE, and allocates a new SAE-TMSI to the UE after the UE accesses the network. If the UE is active, step 805 and step 806 are performed directly, and the new SAE-TMSI allocated is sent to the UE, without the need of paging the UE. Alternatively, a new SAE-TMSI is allocated to the UE when the UE accesses the network after the timer times out. The process is similar to FIG. 8, but no paging occurs.

Figure 9:
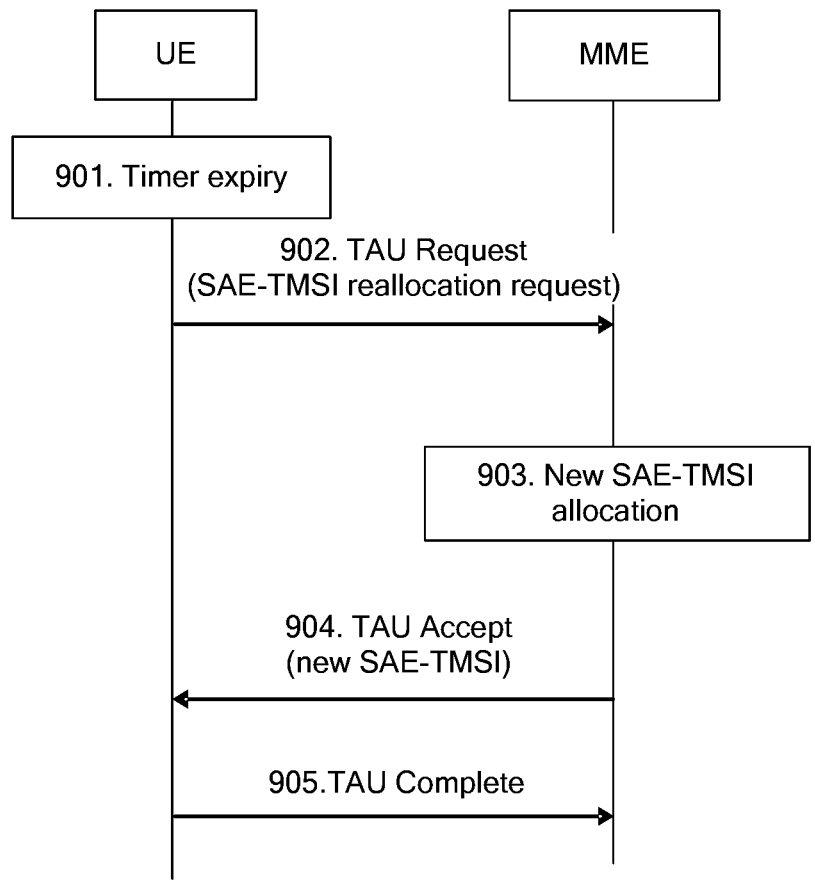
FIG. 9 is a flowchart of the third application instance of reallocating an SAE-TMSI according to an embodiment of the present invention.

FIG. 9 is a flowchart of the third application instance of reallocating an SAE-TMSI according to an embodiment of the present invention. The UE maintains the timer or counter which timer or counter is similar to the one mentioned above. When the timer or counter reaches the threshold, the UE initiates an SAE-TMSI reallocation process. The process is described as below.

In FIG. 9, the UE itself determines allocation of the SAE-TMSI. For example, the UE sets a timer. A TAU request is sent upon timeout of the timer, requesting the network to reallocate an SAE-TMSI. After receiving the TAU request, the network allocates a new SAE-TMSI to the UE, and sends the SAE-TMSI to the UE, as detailed below:

Step 901: After timeout of the timer, the UE sends a TAU request to the MME, requesting to reallocate an SAE-TMSI (namely, step 902).

Step 903: The MME allocates a new SAE-TMSI to the UE, and returns the SAE-TMSI to the UE through a TAU Accept message (namely, step 904).

Step 905: The UE sends a TAU Complete message to the MME.

As regards the method of the access network identifying the SAE-TMSI, when the UE accesses the RAN in the UMTS, the RRC message sent by UE when accessing the RAN carries an Initial Direct Transfer message. An Intra Domain NAS Node Selector is involved in the Initial Direct Transfer message, and may include a P-TMSI. A NAS may also be involved in the Initial Direct Transfer message and is transmitted from the UE to the core network directly, for example, RAU or Attach Request. The RAU request or the Attach Request may include a P-TMSI. Therefore, two P-TMSIs exist in the Initial Direct Transfer message. That leads to waste of resources for the radio air interface. That is, in the UMTS, the RRC message sent by UE when accessing the RAN carries an Initial Direct Transfer message. The Initial Direct Transfer message carries an Intra Domain NAS Node Selector which may include a P-TMSI. The Initial Direct Transfer message may further carry a NAS. The NAS is transmitted from the UE to the core network directly, for example, RAU or Attach Request. The RAU request or the Attach Request may include a P-TMSI. Therefore, two P-TMSIs exist in the Initial Direct Transfer message. That leads to waste of resources for the radio air interface.

Two solutions are put forward herein to cope with the waste of resources in the conventional art, as described below.

Figure 10:
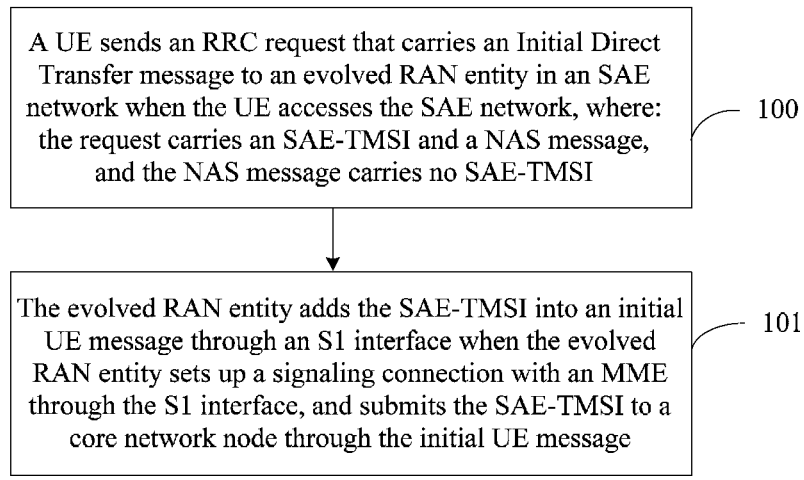
FIG. 10 is a flowchart of transmitting an SAE-TMSI according to an embodiment of the present invention.

A method for transmitting an SAE-TMSI is provided in an embodiment of the present invention. This method is applicable to transmitting an SAE-TMSI from a UE to a core network. As shown in FIG. 10, the method includes:

Step 100: A UE sends an RRC request that carries an Initial Direct Transfer message to an evolved RAN entity in an SAE network when the UE accesses the SAE network, where the request carries an SAE-TMSI and a NAS message, and the NAS message carries no SAE-TMSI.

That is, when the UE accesses an evolved RAN entity, the UE sends an RRC request that carries an Initial Direct Transfer message to the evolved RAN entity. This message carries an SAE-TMSI and a NAS message. The NAS message (such as Attach request and TAU request) does not need to carry the SAE-TMSI. That is because the core network obtains the SAE-TMSI through the initial UE message, and does not need to obtain the SAE-TMSI through the NAS message.

Step 101: The evolved RAN entity adds the SAE-TMSI into an initial UE message through an S1 interface when the evolved RAN entity establishes a signaling association with an MME through the S1 interface, and provides the SAE-TMSI to a core network node through the initial UE message.

That is, the core network node obtains the SAE-TMSI through the initial UE message, but not through the NAS message, thus saving the overhead of the SAE-TMSI carried in the NAS message again, and reducing the resource overhead of the air interface and the S1 interface.

In other words, in the SAE system in this embodiment, the SAE-TMSI is included in the RRC part of the Initial Direct Transfer message, for example, included in the Intra Domain NAS Node Selector. When the RAN node is further connected with the S1-MME, the SAE-TMSI is added into the S1-AP message. In the conventional art, the initial NAS message is carried in the RRC message and the S1-AP message, and the P-TMSI is submitted by the UE to the core network node directly through a NAS message. In this embodiment, however, the SAE-TMSI needs to be submitted only once and is carried only in the RRC message rather than the NAS message, and the UE submits the SAE-TMSI to the RAN, whereupon the RAN submits it to the core network node through an S1-AP initial setup message.

Figure 11:
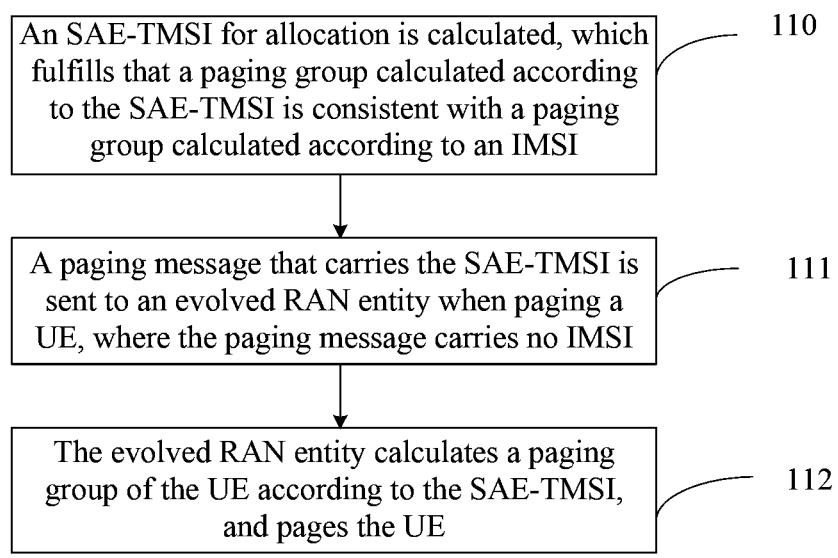
FIG. 11 is a flowchart of allocating an SAE-TMSI according to an embodiment of the present invention.

As shown in FIG. 11, another method for allocating an SAE-TMSI according to an embodiment of the present invention includes the following steps:

Step 110: An SAE-TMSI for allocation is calculated. The SAE-TMSI fulfills that: A paging group calculated according to the SAE-TMSI is consistent with a paging group calculated according to an IMSI.

Step 111: At the time of paging a UE, a paging message that carries the SAE-TMSI is sent to an evolved RAN entity, where the paging message carries no IMSI.

Step 112: The evolved RAN entity calculates a paging group of the UE according to the SAE-TMSI, and pages the UE.

That is, in this embodiment, the SAE-TMSI allocated by the MME to the UE needs to fulfill this requirement: The paging group calculated according to the SAE-TMSI is consistent with the paging group calculated according to the IMSI under a certain algorithm. If they are consistent, when the MME delivers a paging message, the paging message sent to the RAN needs to carry only the SAE-TMSI rather than the IMSI, and the RAN calculates the paging group of the UE according to the SAE-TMSI, and pages the UE.

In this method, the SAE-TMSI allocated by the MME needs to fulfill this requirement: The paging group calculated according to the SAE-TMSI is consistent with the paging group calculated according to the IMSI under a certain algorithm. If they are consistent, when the MME delivers a paging message according to a Discontinuous Receiving (DRX) technology, the paging message sent by the MME to the RAN needs to carry only the SAE-TMSI rather than the IMSI, and the RAN calculates the paging group according to the SAE-TMSI and the calculated paging group is consistent with the paging group calculated according to the IMSI. Therefore, it is not necessary to deliver the IMSI to the RAN, the radio air interface resource is saved, and the IMSI does not need to be exposed at the RAN.

The algorithm for calculating the paging group is not limited. For example, modulo operation is performed. Supposing that the network needs 12 paging groups, the paging group of each IMSI is calculated according to the (IMSI mod 12)+1. That is, the IMSI is considered as a number, which is divided by 12, and a remainder (from 0 to 11) is obtained after the division. The remainder "0" indicates paging group 1, the remainder 1 indicates paging group 2, and so on. The algorithm given here is simple. In practice, the algorithm is not limited. The specific algorithm is appropriate as long as the SAE-TMSI generated by the network fulfills the consistency between the paging group calculated according to the SAE-TMSI under the algorithm and the paging group calculated according to the IMSI.

Figure 12:
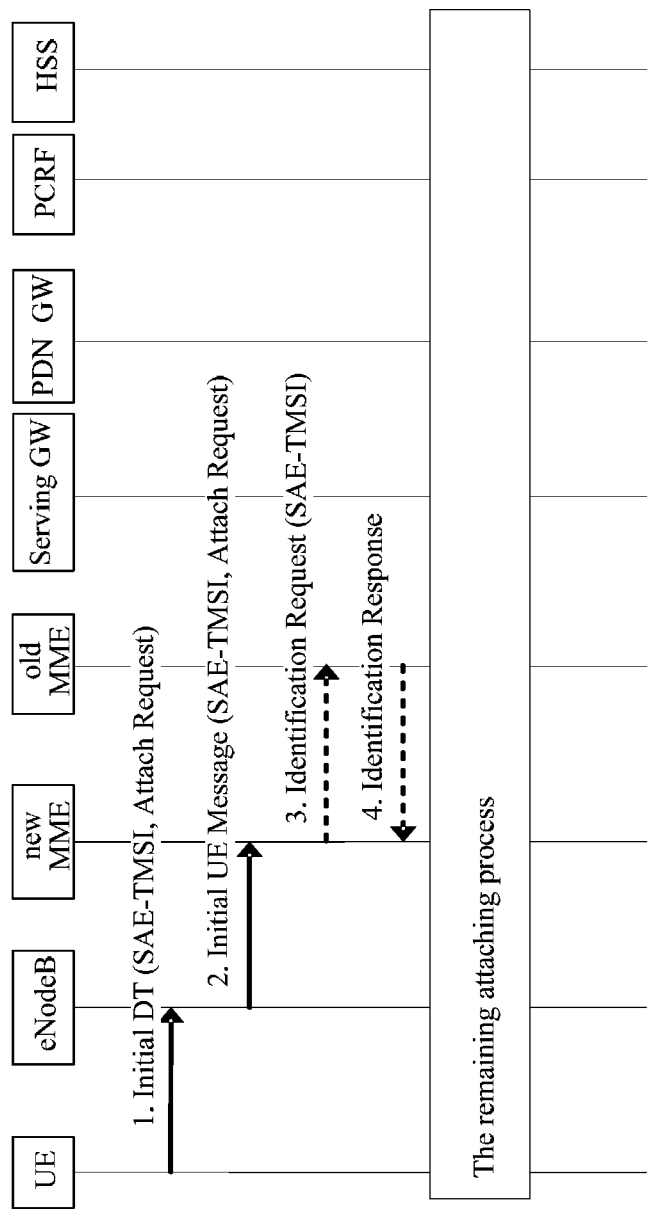
FIG. 12 is a signaling flowchart of the method for allocating an SAE-TMSI shown in FIG. 11.

As shown in FIG. 12, the process of this embodiment includes:

1. The UE sends an Initial Direct Transfer message of an RRC message to the ENB. The NAS message carried in the Initial Direct Transfer message is Attach Request. In order to save resources, this NAS message does not carry the SAE-TMSI, and only the RRC message carries the SAE-TMSI.

2. After receiving the message, the ENB selects or reselects the MME according to the SAE-TMSI in the RRC. After the new MME is determined, the ENB adds the NAS message and the SAE-TMSI into initial UE message of the S1-AP message sent to the new MME. In this way, the new MME obtains the NAS message and the SAE-TMSI. That is, after receiving the Initial Direct Transfer message from the UE, the ENB sends an Initial UE message that carries an SAE-TMSI and an Attach request to the new MME.

3. This step is optional. The new MME may send an identification request to the old MME. The identification request carries an SAE-TMSI (which does not need to carry the old TAI), as illustrated by the dotted line in FIG. 12.

4. The old MME returns an identification response to the new MME, as illustrated by the dotted line in FIG. 12.

In this embodiment, other steps of the attaching process are not detailed here any further.

Figure 13:
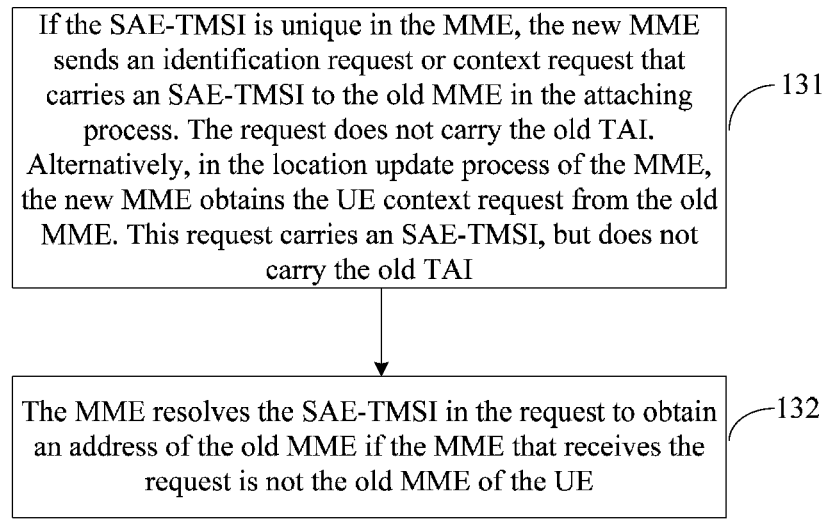
FIG. 13 is a flowchart of a method for receiving and transmitting information according to an SAE-TMSI according to an embodiment of the present invention.

A method for receiving and transmitting information according to an SAE-TMSI is provided in an embodiment of the present invention, as shown in FIG. 13. In this method, the new MME sends an identification request or a context request to the old MME. The identification request or the context request does not need to carry the old TAI. The method includes the following detailed steps:

Step 131: If the SAE-TMSI is unique in the MME, the new MME sends an identification request or context request that carries an SAE-TMSI to an old MME in an attaching process. The request mentioned above does not carry the old TAI. Or the new MME sends a UE context request to an old MME in a location update process of an MME. This request carries an SAE-TMSI, but does not carry the old TAI.

Step 132: The old MME resolves the SAE-TMSI in the request mentioned above to obtain an address of an actual old MME if the old MME is not the actual old MME of the UE.

Figure 14:
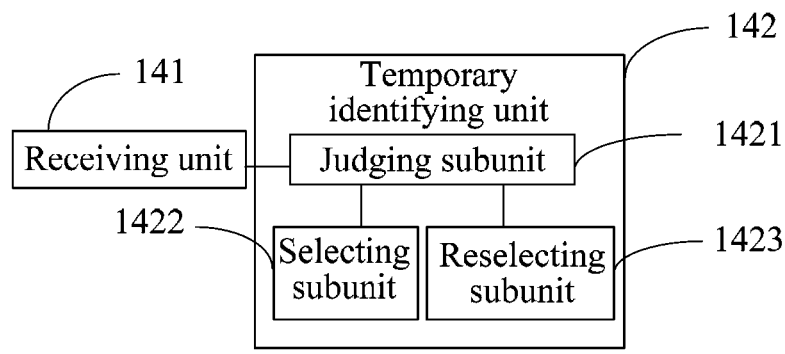
FIG. 14 shows a structure of an apparatus for identifying a UE in an SAE network according to an embodiment of the present invention.

An apparatus for identifying a UE in an SAE network is provided in an embodiment of the present invention. As shown in FIG. 14, the structure of the apparatus includes: a receiving unit 141 and a temporary identifying unit 142.

The receiving unit 141 is configured to receive an SAE-TMSI allocated to the UE which accesses SAE network, where the SAE-TMSI includes at least: a pool-ID, an MME-ID, and a UE temporary identifier.

The temporary identifying unit 142 is configured to use the SAE-TMSI to temporarily identify the UE that accesses the SAE network.

The temporary identifying unit 142 includes: a determining subunit 1421, a selecting subunit 1422, and a reselecting subunit 1423 (illustrated by dotted lines in the figure).

The determining subunit 1421 is configured to: determine whether the pool-ID and the MME-ID in the SAE-TMSI carried in the access request of the UE are the same as those configured in the current resource pool, and, if yes, send a positive result to the selecting subunit 1422, or, if not, send a negative result to the reselecting subunit 1423.

The selecting subunit 1422 is configured to select an MME for the UE according to the positive result.

The reselecting subunit 1423 is configured to select a new MME for the UE according to the negative result, or according to the load balance principle and according to whether the pool-ID in the SAE-TMSI is unique in the PLMN.

This apparatus may be integrated into an evolved RAN entity.

Figure 15:
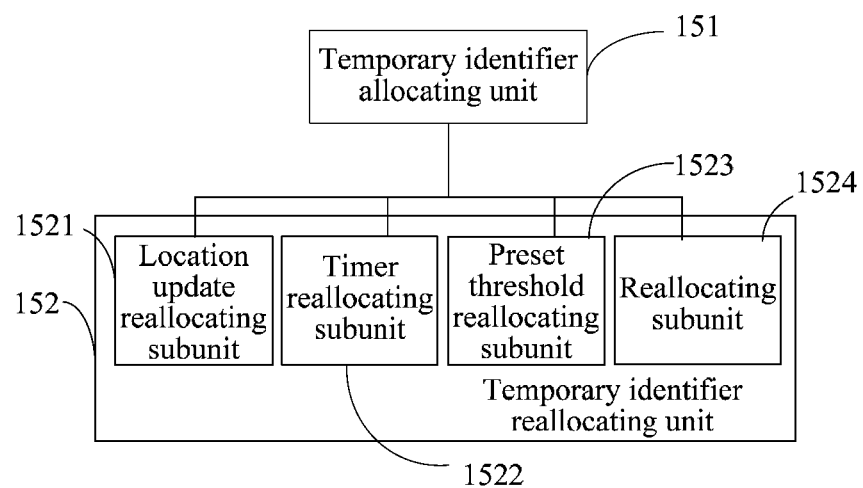
FIG. 15 shows a structure of an MME in an SAE network according to an embodiment of the present invention.

An MME in an SAE network is provided in an embodiment of the present invention. As shown in FIG. 15, the apparatus includes: a temporary identifier allocating unit 151, and/or a temporary identifier reallocating unit 152.

The temporary identifier allocating unit 151 is configured to allocate an SAE-TMSI to the UE which accesses an SAE network, where the SAE-TMSI includes at least: a pool-ID, an MME-ID, and a UE temporary identifier.

The temporary identifier reallocating unit 152 is configured to reallocate an SAE-TMSI to the UE that fulfills preset reallocation conditions. The temporary identifier reallocating unit 152 includes at least one of following subunit: a preset threshold reallocating subunit 1521, a timer reallocating subunit 1522, a location update reallocating subunit 1523, and a reallocating subunit 1524.

The preset threshold reallocating subunit 1521 is configured to reallocate an SAE-TMSI to the UE when the update count of the MME reaches a preset threshold.

The timer reallocating subunit 1522 is configured to reallocate an SAE-TMSI to the UE upon timeout of the timer started after the MME allocates the SAE-TMSI.

The location update reallocating subunit 1523 is configured to reallocate an SAE-TMSI to the UE after receiving a TAU request that carries the SAE-TMSI after timeout of the timer set by the UE.

The reallocating subunit 1524 is configured to send a TAU request that carries an SAE-TMSI or a reallocation request with an SAE-TMSI, when an updated location recorded by a UE is received or a count in a unit of time reaches a preset threshold, and to reallocate an SAE-TMSI to the UE.

Preferably, the temporary identifier allocating unit 151 in this embodiment may be connected with the receiving unit 141 in FIG. 14, and the preset threshold reallocating subunit 1521, the timer reallocating subunit 1522, the location update reallocating subunit 1523, and the reallocating subunit 1524 in this embodiment may be connected with the selecting subunit 142 or the reselecting subunit 143 in FIG. 14.

In this embodiment, therefore, different identifiers are set in the SAE-TMSI. The SAE-TMSI is added into the pool-ID in light of the features of the SAE network. The TA concept employs the Multi-TA Registration mode, where multiple TAs may be allocated to each UE. In order to prevent duplicate SAE-TMSI in the TA, the SAE-TMSI needs to be unique in the pool. Moreover, no duplicate SAE-TMSI is acceptable in adjacent pools with an overlapping part. Therefore, with the pools being distinguished by the pool-ID, the SAE-TMSI is surely unique in the registered area of the UE. The pool-ID may be unique throughout the PLMN. In this way, the SAE-TMSI is unique throughout the PLMN, and the new MME can find the old MME through the SAE-TMSI of the UE to obtain the UE context, without the need of considering the TM. Therefore, the UE does not need to send the TAI. Nevertheless, the pool-ID may be non-unique in the PLMN, and a duplicate pool-ID is acceptable in the pools without any overlapping part. In order to prevent failure of triggering selection of a new MME, it is best that the adjacent pools have no duplicate pool-ID. This method saves the bits of the SAE-TMSI, but the new MME needs to consider the TAI in determining the old MME.

The foregoing technical solution reveals that: Different identifies (including but not limited to: pool-ID, MME-ID, and UE temporary identifier) are set in the SAE-TMSI. When the UE accesses the SAE network, the SAE-TMSI is allocated to the UE, and the SAE-TMSI is used to temporarily identify the UE that accesses the SAE network. In this embodiment, a pool-ID is configured in the SAE-TMSI, which quickens the UE update and processing when the UE accesses the SAE network, simplifies the network resource configuration for the operator, and improves the user satisfaction. Moreover, in this embodiment, the sent message may carry only the SAE-TMSI rather than the old TAI, thus saving the transmission resources.

Although the invention is described through some exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. A method for sending identity information in a system architecture evolved (SAE) network, comprising:

receiving, by a processor, a system architecture evolved (SAE)-temporary mobile subscriber identity (SAE-TMSI) from a mobility management entity (MME) of the SAE network, wherein the SAE-TMSI comprises: a resource pool identifier (pool-ID), a mobility management entity identifier (MME-ID); and a UE temporary identifier;

sending, by the processor, the SAE-TMSI to the MME or a new MME when a user equipment (UE) accesses the SAE network after reselecting the MME or changing to a new MME, wherein the SAE-TMSI is used for the MME or the new MME to identify the UE; and wherein the pool-ID is unique in public land mobile network (PLMN), the MME-ID is unique in a resource pool, and the LIE temporary identifier is unique in an MME.

2. The method according to claim 1, wherein the SAE-TMSI further comprises a public land mobile network identifier (PLMN-ID).

3. The method according to claim 1, wherein the SAE-TMSI is used for the MME of the SAE network or the new MME to identify the UE comprises:
the UE temporary identifier of the SAE-TMSI is used for the MME of the SAE network or the new MME to identify the UE.

4. A system for identifying a user equipment (UE), comprising:
an evolved Radio Access Network (RAN) entity, configured to receive a system architecture evolved (SAE)-Temporary Mobile Subscriber Identity (SAE-TMSI) allocated to the UE when the UE accesses the SAE network, wherein the SAE-TMSI at least comprises: an identifier for a resource pool (pool-ID), an identifier for a mobility management entity (MME-ID) and a UE temporary identifier;
the MME, configured to identify the UE according to the SAE-TMSI when the UE has reselected the MME or has changed to a new MME, wherein the pool-ID is unique in public land mobile network (PLMN), the MME-ID is unique in the resource pool, and the UE temporary identifier is unique in the MME;
wherein the evolved RAN entity is further configured to select the MME according to the pool-ID and the MME-ID.

5. The system according to claim 4, wherein the evolved RAN entity is further configured to select the MME according to a principle, if no MME in the resource pool corresponding to the evolved RAN entity is relevant to the pool-ID and the MME-ID in the SAE-TMSI.

6. The system according to claim 4, wherein the SAE-TMSI further comprises a public land mobile network identifier (PLMN-ID).

7. The system according to claim 4, wherein the MME is further configured to obtain address information of an old MME of the UE and obtain context or identifier information of the UE from the old MME according to the address information.

8. The system according to claim 4, wherein the evolved RAN entity is further configured to select the MME according to a principle, if the evolved RAN entity determines that an old Track Area Identifier (TAI) of the UE does not belong to the resource pool.

9. An apparatus for sending identity information in a system architecture evolved (SAE) network, comprising:
a processor, configured to receive a system architecture evolved (SAE)-temporary mobile subscriber identity (SAE-TMSI) from a mobility management entity (MME) of the SAE network, wherein the SAE-TMSI comprises: a resource pool identifier (pool-ID), a mobility management entity identifier (MME-ID); and a UE temporary identifier;
the processor, configured to send the SAE-TMSI to the MME or a new MME when a user equipment (UE) accesses the SAE network after reselecting the MME or changing to a new MME, wherein the SAE-TMSI is used for the MME or the new MME to identify the UE; and
wherein the pool-ID is unique in public land mobile network (PLMN), the MME-ID is unique in a resource pool, and the LIE temporary identifier is unique in an MME.

10. The apparatus according to claim 9, wherein the SAE-TMSI further comprises a public land mobile network identifier (PLMN-ID).

11. The apparatus according to claim 9, wherein the SAE-TMSI is used for the MME of the SAE network or the new MME to identify the UE comprises:
the UE temporary identifier of the SAE-TMSI is used for the MME of the SAE network or the new MME to identify the UE.

\* \* \* \* \*